No. 823,600. PATENTED JUNE 19, 1906.
L. B. HOUSTON.
SPRING BED BOTTOM.
APPLICATION FILED APR. 16, 1904. RENEWED NOV. 17, 1905.
2 SHEETS—SHEET 1.
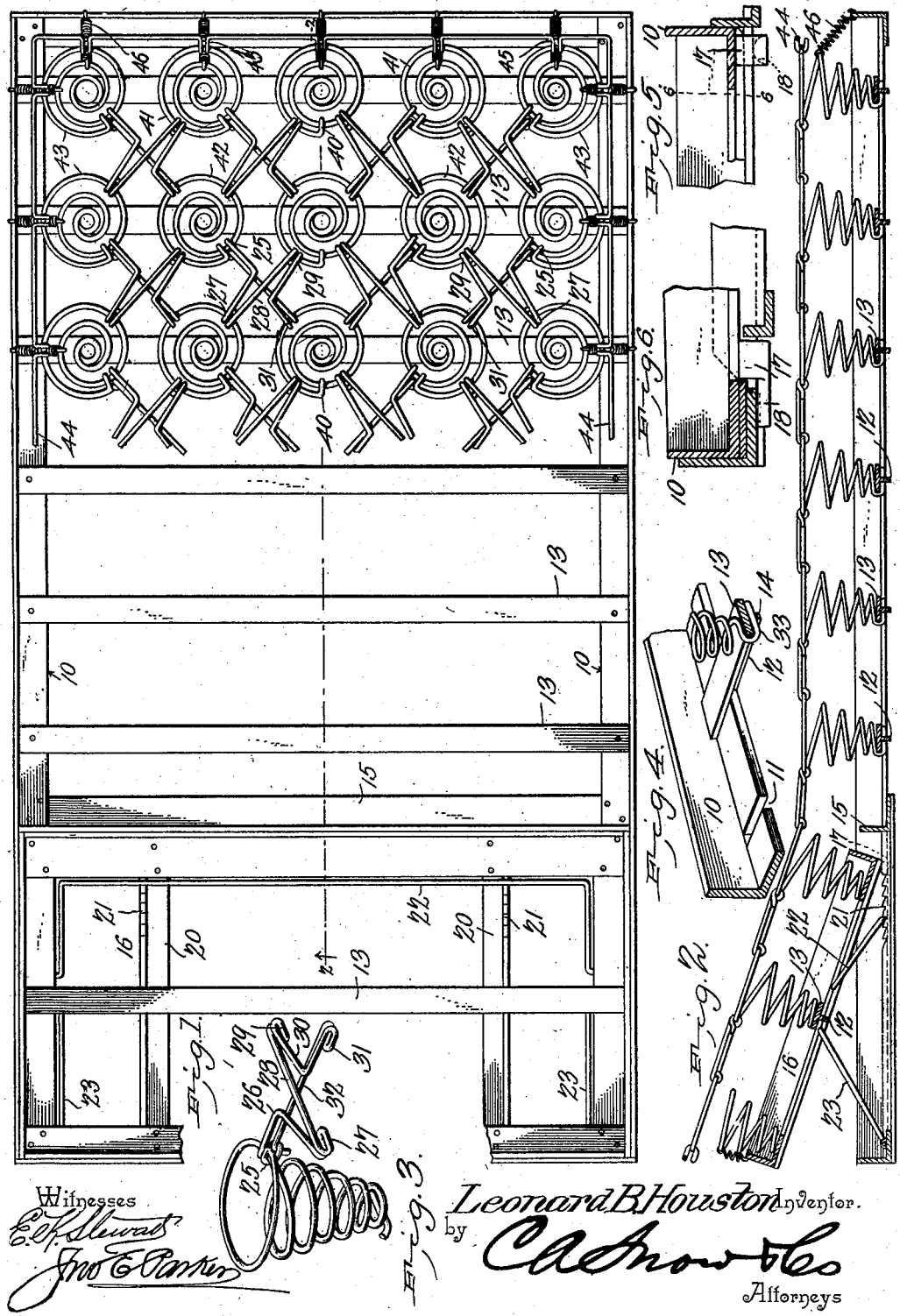
Witnesses
Leonard B. Houston, Inventor.
by C. A. Snow & Co.
Attorneys No. 823,600. PATENTED JUNE 19, 1906.
L. B. HOUSTON.
SPRING BED BOTTOM.
APPLICATION FILED APR. 16, 1904. RENEWED NOV. 17, 1905.
2 SHEETS—SHEET 2.
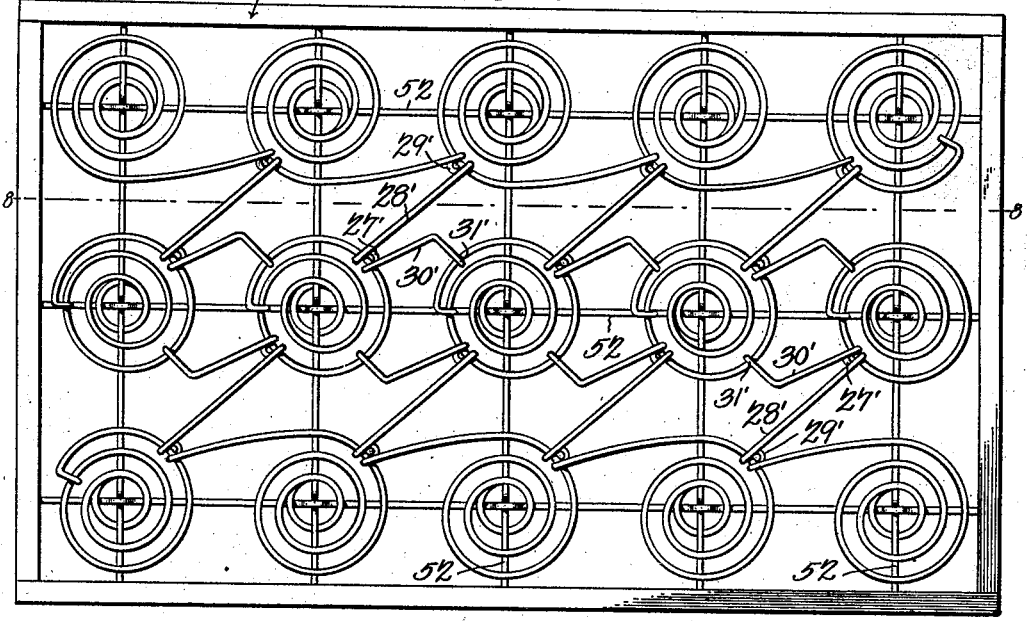
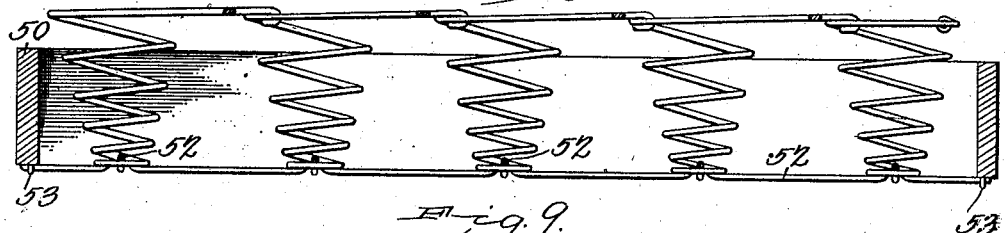
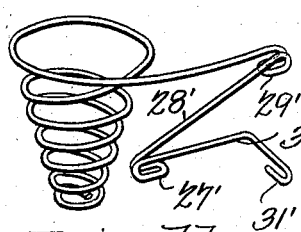
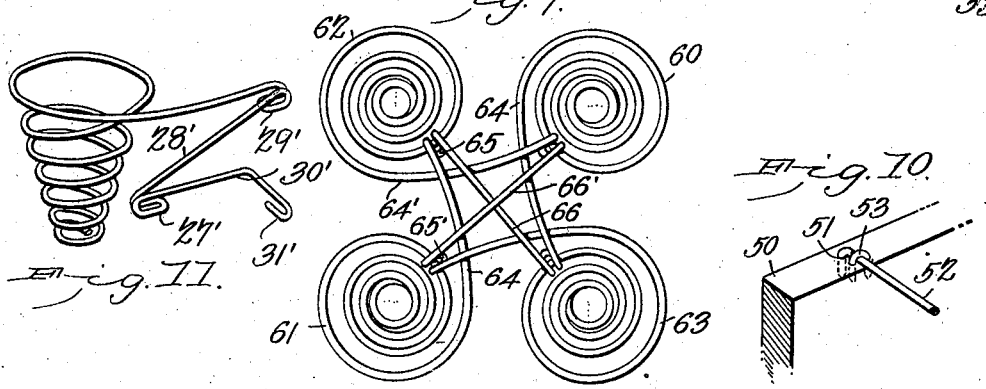
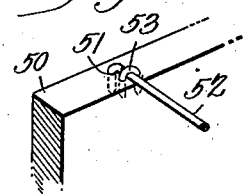
Witnesses
Leonard B. Houston, Inventor.
by
Attorneys

UNITED STATES PATENT OFFICE.

LEONARD B. HOUSTON, OF MOBILE, ALABAMA.

SPRING BED-BOTTOM.

No. 823,600. Specification of Letters Patent. Patented June 19, 1906.

Application filed April 16, 1904. Renewed November 17, 1905. Serial No. 287,842.

*To all whom it may concern:*

Be it known that I, LEONARD B. HOUSTON, a citizen of the United States, residing at Mobile, in the county of Mobile and State of Alabama, have invented a new and useful Spring Bed-Bottom, of which the following is a specification.

This invention relates to certain improvements in the spring structures employed for bed-bottoms and seats of various characters.

One object of the invention is to provide an improved spring structure in the form of a group of springs so connected for mutual support as to transfer a portion of the weight or pressure applied to one spring to two or more connected springs, this preventing injurious pressure at any one point and at the same time avoiding any tendency to lateral displacement.

A further object of the invention is to provide a peculiar form of springs and connecting-brace in which the brace portion is integral with and forms a continuation of the spring and is engaged with a plurality of adjoining springs, thus obviating the necessity of employing separate connecting braces or bridges and permitting the ready assembling of any number of springs to form a structure of the desired size.

A still further object of the invention is to provide an integral spring and brace structure in which the connecting braces or bridges shall extend in substantially radial lines or from center to center of the connected springs in order that the pressure exerted on one spring may be directly transmitted to a connected spring or springs without danger of distorting the connecting bridge or brace.

A still further object of the invention is to provide in devices of this class for the formation and assemblement of a connected group of springs suitable for application to chairs and other seats and in which a group of four springs is formed of two interconnected pairs, each pair being formed of a single length of spring-wire, the connection between the spring-sections proper of each pair being in the form of braces or bridges adapted to engage with the two springs forming the second or opposite pair.

A still further object of the invention is to provide a novel form of spring-supporting frame especially adapted for bed-bottoms and the like, in which provision is made for securely holding the lower ends of the springs in position and in which an adjustable supplemental frame is provided to constitute a head section or rest adjustable to variable angles, a further object in this connection being to provide a simple form of connection between the supplemental and the main frames without weakening either frame by the formation of guiding or holding slots, as is usual in devices of the class.

A still further object of the invention is to provide an improved form of spring-braced frame to which the outer row of springs are connected in order to prevent lateral and longitudinal displacement.

With these and other objects in view the invention consists in the novel construction and arrangement of parts hereinafter described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a plan view of a bed-bottom constructed in accordance with the invention and illustrating a number of interconnected springs of the preferred form. Fig. 2 is a longitudinal sectional elevation of the same on the line 2 2 of Fig. 1. Fig. 3 is a detail perspective view of one of the springs. Fig. 4 is a perspective detail of a portion of the supporting-frame illustrating the manner of connecting the springs. Fig. 5 is a sectional elevation on an enlarged scale of a portion of the structure shown in Fig. 2, illustrating the connection between the main and supplemental frames. Fig. 6 is a sectional elevation of the same on the line 6 6 of Fig. 5. Fig. 7 is a plan view illustrating a number of springs held in a supporting-frame and adapted for use in connection with vehicle and other seats. Fig. 8 is a longitudinal sectional elevation of the same on the line 8 8 of Fig. 7. Fig. 9 is a plan view of a number of springs assembled for use in connection with chair and similar seats. Fig. 10 is a detail perspective view of a portion of the structure shown in Figs. 7 and 8. Fig. 11 is a detail perspective view of one of the springs shown in Fig. 7.

Similar numerals of reference are employed to indicate corresponding parts throughout the several figures of the drawings.

Referring first to Figs. 1 and 2, the main portion of the frame is formed of angle-bars 10, each having a vertical and a horizontal flange or web and connected to form a rectangular frame. The horizontal webs of the side bars are provided with oppositely-disposed notches 11 for the reception of the vertical flanges 12 of T-bars 13, on which the springs are supported, the vertical flanges 12 being each provided with openings 14 for the reception of the lower ends of the springs. Extending transversely across the frame and secured to the opposite side bars thereof is an angle-bar 15, between which and the adjacent end bar of the main frame is formed a recess for the reception of a supplemental frame 16, also formed of light angle-iron and provided with one or more transversely-disposed T-bars 13. The supplemental frame may be adjusted at any desired angle to the horizontal to form a head-rest, and in order to prevent the separation of the parts the supplemental frame is provided with depending lugs 17, having laterally-extending tongues 18, engaging under the side bars of the main frame, the upper surface of said tongues being curved in order not to interfere with the adjustment of the supplemental frame. Extending between the transverse bar 15 and the adjacent end bar of the frame are two angle-bars 20, in the vertical webs of which are a plurality of ratchet-teeth 21, adapted to be engaged by a link 22, having its opposite ends pivoted to the side members of the supplemental frame, and said supplemental frame is connected by links 23 to the end bar of the main frame in such manner as to permit adjustment of the supplemental frame to the desired angular position, the link 22 engaging the ratchet-teeth and locking the said supplemental frame in any position to which it may be adjusted.

In the spring structure each spring is formed integral with a brace or bridging member, by which it is connected directly to three adjacent springs, and each brace or bridge carrying spring is further connected by the braces or bridges of adjacent springs to two or more additional springs, in accordance with its position in the structure.

The preferred form of spring is that illustrated in the detail perspective view in Fig. 3, wherein the wire at the terminal of the spiral wind is bent to form a catch 25, which is hooked over the preceding turn of the wire and is thence continued outwardly to form an angular bridge member 26, terminating in a hook 27 for engagement with an adjacent spring. The wire is thence bent to form a straight connecting-brace 28, which extends in a radial line to a second spring and is provided with a hook member 29 for engagement with said spring. After being bent to form the hook 29 the wire is further bent into the form of an angular brace 30, terminating in a hook member 31 for engagement with a spring at a point diagonally opposite the spring which forms a part of the brace, and the wire is thence bent to form a second radial brace member 32, leading directly to the spring of which it forms a part, the terminal end of the wire being bent to form a catch or hook for engagement with the loop portion of the first catch 25. The members 26 and 30 continue the wire between adjacent springs to form a double hook or catch, the members 28 and 32 being principally relied upon to strengthen the structure and directly transmit pressure or strain at one point to all of the other springs in lines diagonally of the rows of springs. The rigid brace members extend throughout the spring structure on lines approximately at forty-five degrees to the crossing rows of springs, so that the yielding in all cases is approximately in a vertical line and lateral displacement is prevented.

In assembling the springs to form a bed-bottom or other spring structure the lower end of each spring is bent to form a diametral bar 33, which is passed under the horizontal flange of the T-bar 13, thence through the opening 14 in the vertical web of the bar, and thence bent upwardly, so that its end will rest against one side of the T-bar. This forms a secure fastening for the lower ends of the springs. The number of longitudinal rows of springs will depend altogether on the width of the bed and the size of the springs; but preferably it is preferred to employ an odd number of rows, five or seven or more, and one of such rows must be formed of plain springs or springs without the integral brace or bridge members. This row of plain springs may be placed at either side of the structure; but for convenience in assembling it is preferred to place this row of springs in the center of the structure, as illustrated at 40 in Fig. 1, the brace-carrying springs being then placed in position from the opposite sides and working in diagonal lines toward the central row. After the central row is in position the springs 41 are secured to the T-bar, and two of the hook members thereof are engaged with two of the row of plain springs. The springs 42 are next placed in position, the hook members thereof being engaged with two of the row of plain springs and with the third hook of the springs 41. The springs 43 are then placed in position, and two of the hook members thereof are engaged with the springs 41 and 42. In this way the springs are assembled by working on diagonal lines, although it will be understood that the springs may also be assembled by working either in straight longitudinal or transverse rows, if desired, the assemblement in diagonal lines being described as the most convenient method of properly placing the diagonal bracing or bridge pieces in proper relative positions. Throughout the structure the rigid base members extend on straight radial lines or on lines which, if continued, would pass diagonally through the centers of the several rows of springs.

The number of springs with which each of the others is connected depends altogether on the positiion of such springs in the structure. Thus each of the corner springs is connected to three adjacent springs, while all of the other springs in the outer row are connected to five adjacent springs, and each of the remaining springs is connected to the eight springs which surround it.

In order to prevent displacement of the springs, I employ a substantially rigid frame 44, formed of a wire extending completely around the spring structure and having a plurality of integral hooks 45, which engage with all of the springs in the outer rows and prevent such freedom of movement of the outer rows as would tend to displacement. This bar or rod 10 is sufficiently flexible to yield at the juncture of the main and auxiliary frames to permit the necessary angular adjustment of the head-rest. As an additional means for holding the spring structure in place I employ a series of helical tension-springs 46, connected at one end to the vertical webs or flanges of the angle-bars of the frame and at the opposite end to the springs of the outer row.

In Figs. 7 and 8 is illustrated a slight modification of the invention, the structure here shown being especially applicable for use in connection with vehicle-seats and the like. In this case the seat-frame is in the form of a rectangle, comprising a plurality of wooden bars or strips 50, each having a plurality of openings 51 for the reception of the ends of the cross-rods 52, which in this case form the support for the spring structure, the lower ends of the springs being engaged with the rods in the usual manner and the opposite ends of each rod being upwardly bent and adapted to the openings formed in the strips, the rods being afterward secured in position by suitable staples 53. The construction of spring shown in Fig. 7 is more simple than that illustrated in Fig. 3, the end of the wire forming the last coil of the spring being continued in a tangential line and thence bent to form a hook 29' for engagement with the next adjacent spring. The wire is then bent to form a radial brace-rod 28', terminating in a hook 27', and is thence continued in the form of a brace 30' to form a single hook member 31' for engagement with a third spring. In this case the rigid diagonal bracing extends only in one direction throughout the structure, the bracing in the opposite diagonal line being of a yielding nature, but in all cases sufficiently rigid to prevent permanent displacement of the springs or distortion of the bracing members. This form of interconnected springs is especially adapted for use in connection with group-springs, and it is one of the objects of the present invention to make and assemble a group of springs for use in the manufacture of chairs, and in order to simplify the structure and provide a rigid brace between the several springs which form the group said springs are made in integral pairs. A group of this character is illustrated in Fig. 9 and comprises two pairs of interconnected springs, the springs of each pair and their connecting brace or bridge being formed of a single length of wire. The springs 60 and 61 constitute one pair and the springs 62 and 63 the opposite pair. From the terminal-coils of the springs 60 and 61 extend tangential members 64, terminating in hooks 65, which are connected to each other by a straight bracing member 66, arranged in a plane at a right angle to a line passing from center to center of the springs 61, and the springs 62 and 63 are provided with similar members 64', 65', and 66', the several hooks of each pair engaging with the springs of the opposite pair and the crossing members being to some extent interwoven in order to more firmly secure the parts in position.

Having thus described the invention, what is claimed is—

1. In a device of the class specified, a plurality of springs, and a brace member formed integral with each spring and provided with a plurality of hooks or catches for engagement with adjacent springs, each brace including a rigid member extending diagonally from spring to spring.

2. In a device of the class specified, a spring having a brace portion integral with and forming a continuation of the upper part of the spring, said brace member being provided with three engaging hooks or catches for engagement with separate springs, and each of such brace portions including a diagonally-extending rigid member.

3. In a device of the class specified, a spring having a brace portion integral with and forming a continuation of the upper coil of the spring, said brace member being bent in such manner as to form a pair of rigid brace-bars arranged at right angles to each other and provided with terminal hooks or catches.

4. In a device of the class specified, a spring having a brace member forming a continuation of the upper coil of the spring and bent to form a plurality of spring-engaging hooks or catches, one of which is engaged with a subjacent coil of the spring of which it forms a part.

5. In a device of the class specified, a group of springs formed of interconnected pairs, each pair being formed of a single piece of wire, that portion of the wire between each pair being bent to form a straight bar or brace disposed in a plane at a right angle to a plane including the centers of the springs of which it forms a part, said bar or brace being provided with terminal hooks or catches for engagement with the springs of the opposite pair.

6. In a device of the class specified, a rigid frame formed of a plurality of angle-bars having vertical and horizontal webs, the vertical webs forming the outer walls of the frame, there being slots in the horizontal webs of the side members of the frame, T-shaped spring-supporting bars having their vertical webs adapted to said slots, and held from longitudinal play by the engagement of the horizontal webs of the T-bars with the vertical webs of the frame-bars and springs supported by said bars.

7. In a device of the class specified, side and end bars formed of angle-iron and connected together to form a rectangular frame, the horizontal webs of the side bars being provided with oppositely-disposed slots, T-shaped bars having their central webs adapted to said slots and each of said central webs having a plurality of spring-receiving openings, and springs supported on the bars and having their lower ends extending through said openings.

8. In a device of the class specified, a main frame formed of angle-iron, a supplemental frame also formed of angle-iron and adjustable at an angle to the horizontal, a tongue depending from the supplemental frame and engaging the side bars of the main frame, a plurality of springs assembled to form a mattress, said springs being supported in part by the main frame and in part by the auxiliary frame, and a continuous spring-brace extending around all of the springs and connected thereto.

In testimony that I claim the foregoing as my own I have hereto affixed my signature in the presence of two witnesses.

L. B. HOUSTON.

Witnesses:
S. KAHN,
WM. F. BULLOCK, Jr.,